(12) United States Patent
Tanaka et al.

(10) Patent No.: US 7,112,911 B2
(45) Date of Patent: Sep. 26, 2006

(54) VIBRATIONAL POWER GENERATION DEVICE VIBRATOR

(75) Inventors: Hidetoshi Tanaka, Kokubunji (JP); Norio Ohkubo, Tokyo (JP); Masafumi Kanetomo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 10/767,438

(22) Filed: Jan. 30, 2004

(65) Prior Publication Data

US 2005/0040654 A1 Feb. 24, 2005

(30) Foreign Application Priority Data

Aug. 20, 2003 (JP) ............................. 2003-295806

(51) Int. Cl.
- H02N 1/00 (2006.01)
- H02N 2/00 (2006.01)
- H01L 41/04 (2006.01)
- F02B 63/04 (2006.01)
- F03G 7/08 (2006.01)

(52) U.S. Cl. ...................... 310/309; 310/365; 310/308; 290/1 R (58) Field of Classification Search ........... 310/323.01, 310/324, 325, 365, 328, 309, 308, 306; 73/514.32, 73/514.12

See application file for complete search history.

(56) References Cited

U.S. PATENT DOCUMENTS

| | | | | |
|---|---|---|---|---|
| 2,567,373 A | * | 9/1951 | Giacoletto et al. | 307/110 |
| 2,975,307 A | * | 3/1961 | Schroeder et al. | 310/309 |
| 3,641,373 A | * | 2/1972 | Elkuch | 310/309 |
| 4,381,672 A | * | 5/1983 | O'Connor et al. | 73/504.15 |
| 4,515,016 A | * | 5/1985 | Hartemann et al. | 73/514.28 |
| 4,814,657 A | * | 3/1989 | Yano et al. | 310/309 |
| 5,417,312 A | * | 5/1995 | Tsuchitani et al. | 188/181 A |
| 6,105,427 A | * | 8/2000 | Stewart et al. | 73/514.32 |
| 6,196,067 B1 | * | 3/2001 | Martin et al. | 73/514.32 |
| 6,263,735 B1 | * | 7/2001 | Nakatani et al. | 73/514.36 |
| 6,263,736 B1 | * | 7/2001 | Thundat et al. | 73/514.36 |
| 6,479,920 B1 | * | 11/2002 | Lal et al. | 310/309 |
| 6,497,148 B1 | * | 12/2002 | Abe et al. | 73/504.16 |
| 6,531,804 B1 | * | 3/2003 | Kasahara | 310/309 |

(Continued)

OTHER PUBLICATIONS

Scott Meninger et al., "Vibration-to-Electric Energy Conversion", IEEE Transactions on Very Large Scale Integration (VLSI) Systems, vol. 9, No. 1, Feb. 2001, pp. 64-76.

(Continued)

Primary Examiner—Julio C. Gonzalez
(74) Attorney, Agent, or Firm—Reed Smith LLP; Stanley P. Fisher, Esq.; Juan Carlos A. Marquez, Esq.

(57) ABSTRACT

Unnecessary moment in a vibrator is remarkably reduced and the power generation efficiency in capacitance-type vibrational power generation is remarkably improved. A vibrator provided in a variable-capacitance type vibrator has a structure in that one ends of oscillation plates extending in a longitudinal direction thereof sandwiches a mass and the other ends thereof sandwiches a spacer, respectively, wherein the oscillation plates are arranged parallel to each other. A space portion between the oscillation plates and in which the mass and the spacer are not in contact with each other functions as a spring. By holding the mass by the two oscillation plates, the mass can be oscillated while it is in parallel to an opposing electrode. Therefore, generation of unnecessary moment in a direction other than an oscillation direction can be remarkably reduced.

5 Claims, 6 Drawing Sheets

U.S. PATENT DOCUMENTS

| | | | |
|---|---|---|---|
| 6,670,738 B1 * | 12/2003 | Kasahara et al. | 310/309 |
| 6,720,704 B1 * | 4/2004 | Tavkhelidze et al. | 310/306 |
| 6,750,590 B1 * | 6/2004 | Potter | 310/309 |
| 2001/0028203 A1 * | 10/2001 | Kasahara et al. | 310/309 |

OTHER PUBLICATIONS

Shad Roundy et al., "Capacitance Based Micro Structures for Converting Vibrational Energy to Electric Energy", http://kingkong.me.berkeley.edu/~shadr/MEMSFinProj.pdf, 2 pages.

* cited by examiner

VIBRATIONAL POWER GENERATION DEVICE VIBRATOR

BACKGROUND OF THE INVENTION

The present invention relates to a power generation technology for converting mechanical vibrational energy into electric energy, and particularly to a technique effectively applied to variable-capacitance type vibrational power generation in which variable capacitances are changed by the vibrational energy to perform power generation.

For example, IEEE Trans. VLSI Systems, pp. 64–76, Vol. 9, no. 1, 2001 (Non-patent Document 1) discloses a technique for performing power generation by the vibrational energy, the technique in which: electrodes are provided at a fixed end of a vibrator operating in resonance with the vibrational energy; a variable capacitance capable of realizing valiance of capacitance by changing a distance between the electrodes depending on the operation of the vibrator is used; electric charges are applied to the electrodes of the variable capacitance; the Coulomb attraction is exerted between the opposing electrodes through the electric charges; and energy obtained by its work which the operation of the vibrator does against the attraction is converted into electric energy.

[Non-patent Document 1]
IEEE Trans. VLSI Systems, pp. 64–76, Vol. 9, no. 1, 2001.

SUMMARY OF THE INVENTION

However, the inventors of the present invention have found that the following problem arises in the above-mentioned power generation technique for converting vibrational energy into electric energy.

That is, only a shape and a size of an oscillation plate are determined with disregard to operational modes other than those for desired operations in a variable-capacitance type vibrator. Therefore, the vibrator performs various operations besides desired operations, whereby desired capacitance changes cannot be obtained due to an influence of the vibration on the capacitance changes.

Moreover, the frequency of external oscillation applied to the vibrator is set at a known one. Therefore, when the frequency of the external oscillation is changed, any deviation from its timing occurs. For this reason, a problem is such that power generation by the variable-capacitance vibrator is reduced in power generation efficiency or cannot be made.

An object of the present invention is to provide a vibrational power generation device vibrator capable of remarkably improving the power generation efficiency of capacitance-type vibrational power generation.

The above and other objects and novel features will be appear from the description of the specification and the accompanying drawings.

Outlines of representative ones of the inventions disclosed in this application will be briefly described as follows.

A vibrational power generation device vibrator according to the present invention comprises: first and second electrodes constituting a first capacitance; third and fourth electrodes constituting a second capacitance; a vibrator provided with said first and third electrodes; an electrode base provided with said second and fourth electrodes; a vibrator pedestal for fixing said vibrator onto said electrode base; and an electrode terminal respectively connected to said first to fourth electrodes and performing an input and output of electric charges from the exterior, wherein said vibrator includes a mass performing an undriven vibration and two oscillation plates for supporting said mass, wherein said oscillation plates sandwich and support a first surface of said mass and a second surface opposite thereto in a mutually parallel manner, and wherein said vibrator is operated through vibrational energy to change a capacitance by controlling a distance between said first and third electrodes and a distance between said second and fourth electrodes provided at said vibrator.

Further, outlines of other inventions in the present application will be briefly described.

A vibrational power generation device vibrator according to the present invention comprises: first and second electrodes constituting a first capacitance; a vibrator provided with said first and second electrodes; a vibrator pedestal for fixing said vibrator onto an electrode base; and an electrode terminal respectively connected to said first and second electrodes and performing an input and output of electric charges from the exterior, wherein said vibrator includes a mass performing an undriven vibration and two oscillation plates for supporting said mass, wherein said oscillation plates sandwich and support a first surface of said mass and a second surface opposite thereto in a mutually parallel manner, and wherein said vibrator is operated through vibrational energy to change a capacitance by controlling a distance between said first and third electrodes and a distance between said second and fourth electrodes provided at said vibrator.

Additionally, a vibrational power generation device vibrator according to the present invention comprises: first and second electrodes constituting a first capacitance; a vibrator provided with said first and second electrodes; a vibrator pedestal for fixing said vibrator onto said electrode base; and an electrode terminal respectively connected to said first and second electrodes and performing an input and output of electric charges from the exterior, wherein said vibrator includes n-1 masses performing undriven vibration and n oscillation plates for supporting said n-1 masses, wherein said n oscillation plates sandwich and support first surfaces of said n-1 masses and second surfaces opposite thereto in a mutually parallel manner, and wherein said vibrator is operated through vibrational energy to change a capacitance by controlling a distance between said first and second electrodes provided at said vibrator.

Effects obtained by representative ones of the inventions disclosed in this application will be briefly described as follows.

(1) By using the oscillation plates parallel to the vibrator, it is possible to reduce loss of capacity of the power generation vibrator and thereby improve the power generation efficiency.

(2) By monitoring operations of the vibrator, it is possible to perform input and output of electric charges at optimum timings and thereby improve the power generation efficiency of the vibrator for power generation.

(3) BY items (1) and (2) as mentioned above, it is possible to realize a vibrational power generator system with high performance and high reliability.

DETAILED DESCRIPTION OF THE PREFERRED EMBODIMENTS

Hereinafter, embodiments of the present invention will be detailed based on the drawings. Note that, throughout all the drawings for describing the embodiments, the same members are denoted by the same reference numeral in principle and repetition of description thereof will be omitted.

First Embodiment

Figure 1:
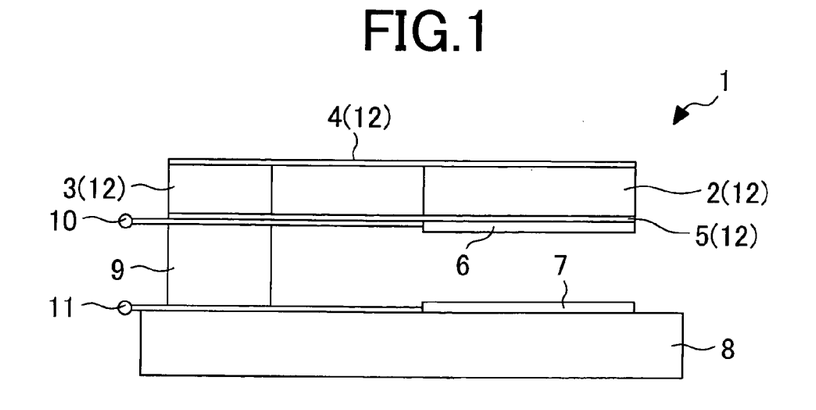
FIG. 1 is a side view showing a structure of a variable-capacitance type vibrator according to a first embodiment of the present invention.
Figure 2:
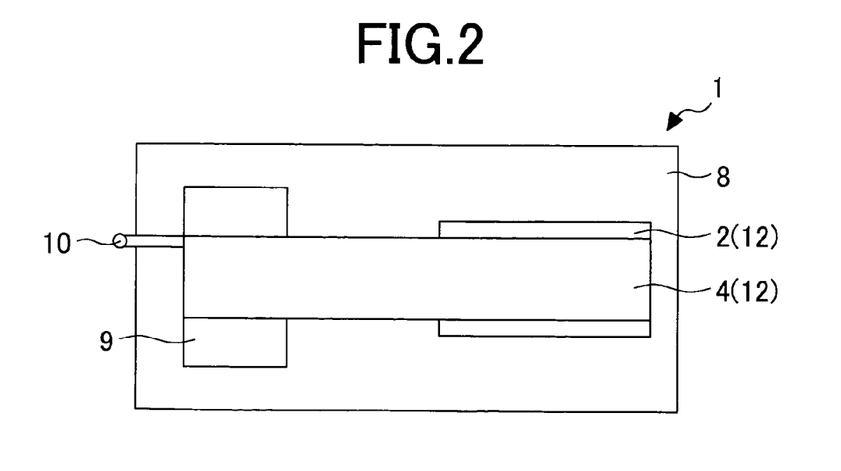
FIG. 2 is a top view of the variable-capacitance type vibrator in FIG. 1.
Figure 3:
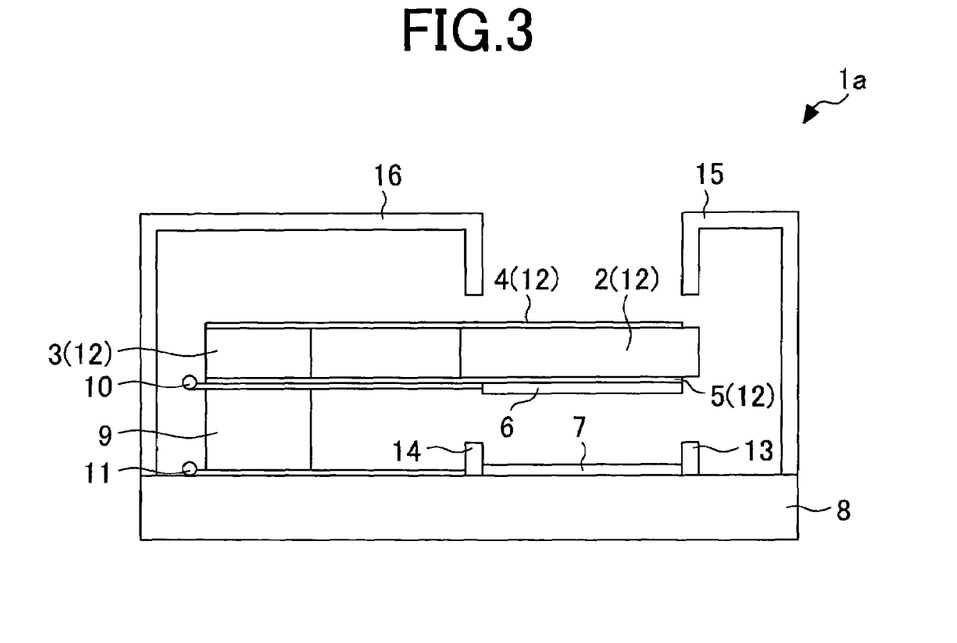
FIG. 3 is a side view showing another structure of a variable-capacitance type vibrator according to a first embodiment of the present invention.
Figure 4:
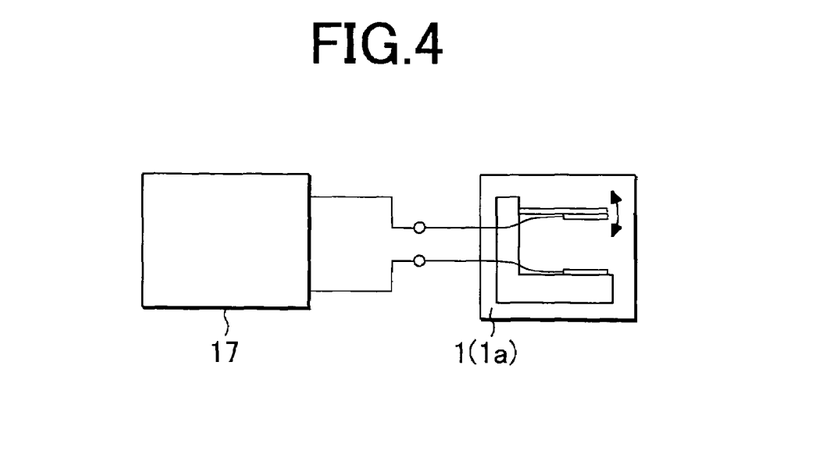
FIG. 4 is a block view showing an example of vibrational power generator system according to a first embodiment of the present invention.

FIG. 1 is a side view showing a structure of a variable-capacitance type vibrator according to a first embodiment of the present invention; FIG. 2 is a top view of the variable-capacitance type vibrator in FIG. 1; FIG. 3 is a side view showing another structure of a variable-capacitance type vibrator according to a first embodiment of the present invention; and FIG. 4 is a block view showing an example of vibrational power generator system according to a first embodiment of the present invention.

In a first embodiment, a variable-capacitance type vibrator (vibrational power generation device vibrator) 1 comprises, as illustrated in FIG. 1, a mass 2, a spacer 3, oscillation plates 4 and 5, electrodes 6 and 7, an opposite electrode base 8, a vibrator pedestal 9, and electrode wiring terminals (electrode terminals) 10 and 11.

The oscillation plates 4 and 5 are each formed into, for example, a rectangular plate, and the mass 2 is sandwiched between one ends of the oscillation plates 4 and each extending in a longitudinal direction while the spacer 3 is sandwiched between the other ends of the oscillation plates 4 and 5 each extending in the longitudinal direction.

The mass 2, the spacer 3, and the oscillation plates 4 and 5 constitute a vibrator 12, and a space portion, in which the mass 2 and the spacer 3 on the oscillation plates 4 and 5 are not in contact with each other, functions as a spring.

In the vibrator 12, a surface opposite to the surface on which the spacer 3 on the lower oscillation plate 5 is disposed is fixed to an upper surface of the vibrator pedestal 9 having, for example, a rectangular parallelepiped shape. A lower surface of the vibrator pedestal 9 is fixed to the electrode base 8, and the above-mentioned spring portion of the vibrator 12 and the mass 2 form a parallel space between the same and the electrode base 8.

The electrode (first electrode) 6 having, for example, a rectangular shape is provided on a surface opposite to the surface on which the mass 2 on the oscillation plate 5 is disposed, and the electrode (second electrode) 7 having the same shape as the electrode 6 is provided on an upper surface of the vibrator pedestal 9 facing the electrode 6. A capacitance is constituted by these electrodes 6 and 7. Output wires are respectively connected to the electrodes 6 and 7, and the electrode wiring terminals 10 and 11 are respectively connected to these output wires.

By thus holding the mass 2 by the two oscillation plates 4 and 5, the mass 2 can be oscillated while it is maintained parallel to the electrode 7 facing it. Therefore, occurrence of unnecessary moment except the moment of the oscillation direction can be remarkably reduced.

FIG. 2 is a top view showing a structure of a variable-capacitance type vibrator 1. As illustrated, the oscillation plate 4 may be smaller or larger in width than the mass 2, and it is desirable that the width of the oscillation plate 4 coincides with that of the mass 2 and their central lines match.

Since the oscillation plate 5 is identical to the oscillation plate 4 in size, it is overlapped with the oscillation plate 4 in FIG. 1. Further, the oscillation plate 4 may concurrently serve as an electrode, or the opposite electrode base 8 may concurrently serve as an electrode, or the oscillation plate 4 may concurrently serve as an electrode.

Instead of the structure of sandwiching the mass 2 and the spacer 3 between the oscillation plates 4 and 5, the oscillation plates 4 and 5 may be formed so that the oscillation plate 4 supports an upper end of the mass 2 on a side of the spacer 3 and the oscillation plate 5 supports a lower end thereof, and the oscillation plate 4 supports an upper end of the spacer 3 on a side of the mass 2 and the oscillation plate 5 supports a lower end thereof. In this case, the electrode 6 is provided at the mass 2.

The variable-capacitance type vibrator 1 may be formed also by, for example, pruning metallic or insulating materials and assembling the pruned ones.

Further, the structure shown in FIG. 1 can be formed also by employing a Si (silicon) process, and one example of the Si process will now be described.

By using a silicon wafer substrate, a metallic coating such as Al (aluminum) is deposited on the electrode base 8, and is etched up to the size of the electrode to provide the electrode 7 and the electrode wiring terminal 11. Subsequently, after depositing PSG (silicon oxide) to be a sacrifice layer in the above-described space between the electrodes, anchor etching is performed to provide the vibrator pedestal 9.

Then, an insulating nitride coating to be the vibrator pedestal 9 is deposited up to the same thickness as that of the above-described sacrifice layer; a metallic coating such as Al is deposited and etched for obtaining the electrode 6 and the electrode wiring terminal 10; an oxide film is deposited to obtain the oscillation plate 5; PSG is deposited; and the anchor etching is performed so that a portion to be the above-mentioned space between the oscillation plates 4 and 5 is left.

Thereafter, an insulating nitride coating to be the mass 2 and the spacer 3 is deposited up to approximately the same thickness as that of the above-described sacrifice layer, and an oxide film serving as the oscillation plate 4 is deposited, and the sacrifice layer is finally removed by using HF (Hydrofluoric acid) or the like.

When the sacrifice layer is removed, a nitride-type film is employed as the oxide film in order to make large an etching rate ratio of the sacrifice layer and other oxide films. Further, if the oscillation plate 5 is used as an electrode, the above-described process for the electrode 6 is omitted and metallic coatings are used for the oscillation plates 4 and 5.

Moreover, if the opposite electrode base 8 is used as an electrode, the above-described process for the electrode 7 is omitted and high-density ions are implanted to a range of the electrode size in the silicon wafer substrate for electrode base.

FIG. 3 is a side view showing another structure of a variable-capacitance type vibrator (vibrational power generation device vibrator) 1*a*.

In the variable-capacitance type vibrator 1*a*, stoppers 13 to 16 are newly provided in addition to the structure comprising the mass 2, the spacer 3, the oscillation plates 4 and 5, the electrodes 6 and 7, the opposite electrode base 8, the vibrator pedestal 9, and the electrode wiring terminals 10 and 11 as shown in FIG. 1.

Since the structure of having the mass 2, the spacer 3, the oscillation plates 4 and 5, the electrodes 6 and 7, the opposite electrode base 8, the vibrator pedestal 9, and the electrode wiring terminals 10 and 11 is identical to that of the variable-capacitance type vibrator 1 in FIG. 1, and so the explanation thereof will be omitted.

Also in this case, the vibrator 12 is constituted by the mass 2, the spacer 3 and the oscillation plates 4 and 5, and a space portion in which the mass 2 and the oscillator 3 on the oscillation plates 4 and 5 are not in contact with each other functions as a spring.

Stoppers (contact prevention devices) 13 and 14 are provided in the vicinity of the electrode 7 of the vibrator pedestal 8. These stoppers 13 and 14 are formed so as to project from the vibrator pedestal 8. The stoppers 13 and 14 are provided to prevent short circuit by contact of the electrodes when the electrode 6 comes close to the electrode 7. Only either one of the stoppers 13 and 14 may be provided, or the number of stoppers may be two or more.

Stoppers (oscillation control structures) 15 and 16 are made of a member having, for example, a J-shaped section. One end of the stopper 15 is fixed to one end of the opposite electrode base 8 in its longitudinal direction while one end of the stopper 16 is fixed to the other end of the opposite electrode base 8 in the longitudinal direction.

The other ends of the stoppers 15 and 16 are disposed above the oscillation plate 4. Further, the stoppers 15 and 16 are provided to prevent the oscillation plates 4 and from be broken by making too long a distance between the electrodes at the time when the above-described electrodes 6 and 7 of the vibrator separate from each other.

Only either one of the stoppers 15 and 16 may be provided, or the number of stoppers may be two or more. Further, among the stoppers 13 and 14 for electrode contact prevention and the stoppers 15 and 16 for oscillation-plate breakage prevention, only either ones of the electrode contact prevention stoppers and the oscillation-plate breakage prevention stoppers may be adopted.

The oscillation plate 5 may concurrently serve as an electrode, or the opposite electrode base 8 may concurrently serve as an electrode. Instead of the structure of sandwiching the mass 2 and the spacer 3 between the oscillation plates, the oscillation plates 4 and 5 may be formed so that the oscillation plate 4 supports an upper end of the mass 2 on a side of the spacer 3 and the oscillation plate 5 supports a lower end thereof, and the oscillation plate 4 supports an upper end of the spacer 3 on a side of the mass and the oscillation plate 5 supports a lower end thereof. In this case, the electrode 6 is provided at the mass 2.

FIG. 4 is a block view showing an example of vibrational power generator system power-generated by the converting vibration energy into electrical energy using variable-capacitance type vibrator 1(, 1*a*).

As illustrated in FIG. 4, the vibrational power generator system is comprised of a capacitance-type vibrational power generation control circuit 17 and the variable-capacitance type vibrator 1 (, 1*a*) as illustrated in FIG. 1 (or FIG. 3). The capacitance-type vibrational power generation control circuit 17 performs input and output of electric charges based on the capacitance change in the vibrator 12 of the variable-capacitance type vibrator 1 (, 1*a*), thereby generating power.

For this reason, according to the first embodiment, by supporting the mass 2 through the oscillation plates 4 and 5, capacitance loss of the vibrator 12 can be reduced, whereby the power generation efficiency can be remarkably improved.

Also, by providing the stoppers 13 and 14, the contact between the electrodes 4 and 5 and the electrodes 6 and 7 can be certainly prevented, and by providing the stoppers 15 and 16, excess vibration of the oscillation plates 4 and 5 can be certainly prevented, whereby the power generation efficiency and the reliability of the variable-capacitance type vibrator 1*a* can be improved.

Second Embodiment

Figure 5:
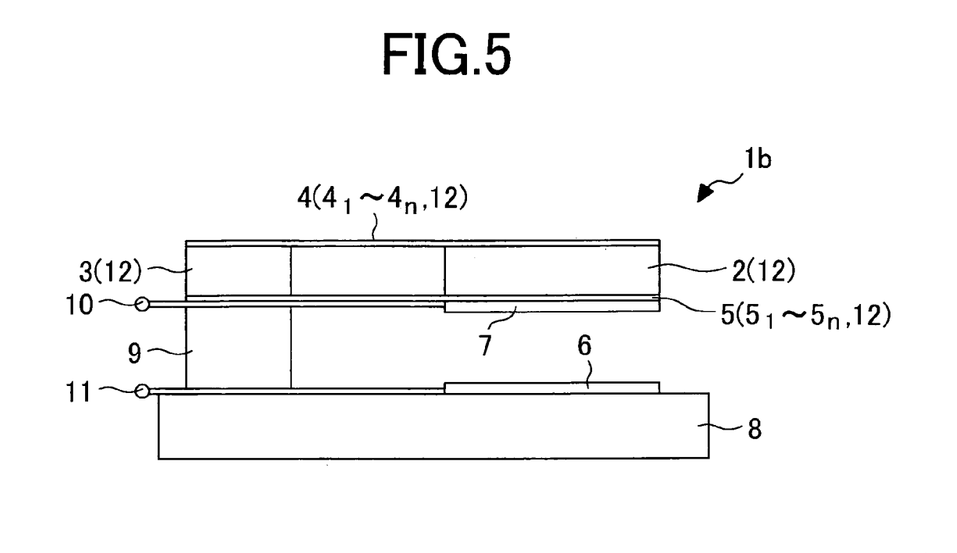
FIG. 5 is a side view showing a structure of a variable-capacitance type vibrator according to a second embodiment.
Figure 6:
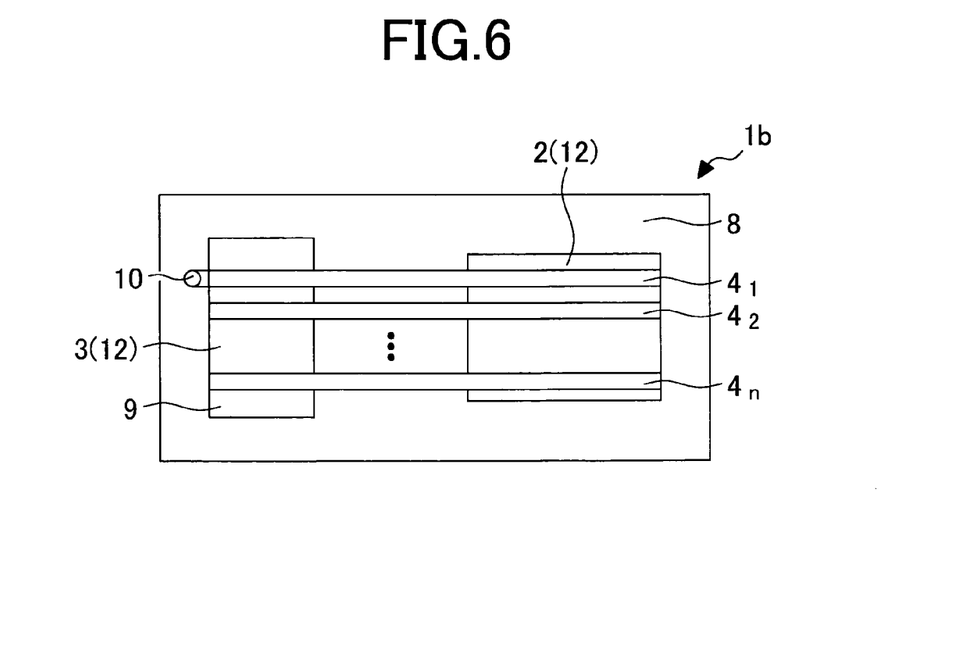
FIG. 6 is a top view of the variable-capacitance type vibrator in FIG. 5.

FIG. 5 is a side view showing a structure of a variable-capacitance type vibrator according to a second embodiment, and FIG. 6 is a top view of the variable-capacitance type vibrator in FIG. 5.

In a second embodiment, a variable-capacitance type vibrator (vibrational power generation device vibrator) 1*b* comprises, as illustrated in FIG. 5, a mass 2, a spacer 3, oscillation plates 4 and 5, electrodes 6 and 7, an opposite electrode base 8, a vibrator pedestal 9, and electrode wiring terminals 10 and 11, and a difference between the present embodiment and the first Embodiment shown in FIG. 1 is that the oscillation plates 4 and 5 are comprised of a plurality of oscillation plates $4_1$ to $4_n$ and $5_1$ to $5_n$.

FIG. 6 is a top view of the variable-capacitance type vibrator 1*b*.

As illustrated, the oscillation plates $4_1$ to $4_n$ and $5_1$ to $5_n$ are arranged so as to sandwich the mass 2 and the spacer 3 between them at equal intervals. The number of respective oscillation plates may be arbitrary if being two or more, and it is desirable that the central lines of the oscillation plates $4_1$ to $4_n$ disposed at equal intervals and that of the mass 2 coincide with each other.

The oscillation plates $5_1$ to $5_n$ are disposed at the same positions as those of the oscillation plates $4_1$ to $4_n$ (FIG. 5), and are overlapped with the oscillation plates $4_1$ to $4_n$ in FIG. 6. Further, the oscillation plates $4_1$ to $4_n$ may concurrently serve as electrodes or the opposite electrode base 8 may concurrently serve as an electrode.

Particularly, in this case, the entire surface of each of portions overlapping with the mass 2 and the spacer 3 on the oscillation plates $4_1$ to $4_n$ and $5_1$ to $5_n$ may constitute one oscillation plate. Further, instead of the structure of sandwiching the mass 2 and the spacer 3 between the oscillation plates $4_1$ to $4_n$ and $5_1$ to $5_n$, the oscillation plates $4_1$ to $4_n$ and $5_1$ to $5_n$ may be formed so that the oscillation plates $4_1$ to $4_n$ support an upper end of the mass 2 on the side of the spacer and the oscillation plates $5_1$ to $5_n$ support a lower end thereof, and the oscillation plates $4_1$ to $4_n$ support an upper end of the spacer 3 on the side of the mass and the oscillation plates $5_1$ to $5_n$ support a lower end thereof. In this case, the electrode 6 is provided at the mass 2.

In the variable-capacitance type vibrator 1b, the vibrator 12 is constituted by the mass 2, the spacer 3, and the oscillation plates $4_1$ to $4_n$ and $5_1$ to $5_n$, and a space portion between the oscillation plates $4_1$ to $4_n$ and $5_1$ to $5_n$ and at which the mass 2 and the spacer 3 are not in contact with each other functions as a spring.

The variable-capacitance type vibrator 1b can be formed by using the same method as that of the first embodiment described above (FIG. 1). However, when the SI process is used, a space with a predetermined distance is provided between the oscillation plates $4_1$ to $4_n$ and $5_1$ to $5_n$. Therefore, this embodiment has the features that etching liquid for sacrifice layer is easily permeated.

For this reason, also in the second embodiment, it is possible to reduce capacitance loss of the vibrator 12 and to remarkably improve the power generation efficiency.

Third Embodiment

Figure 7:
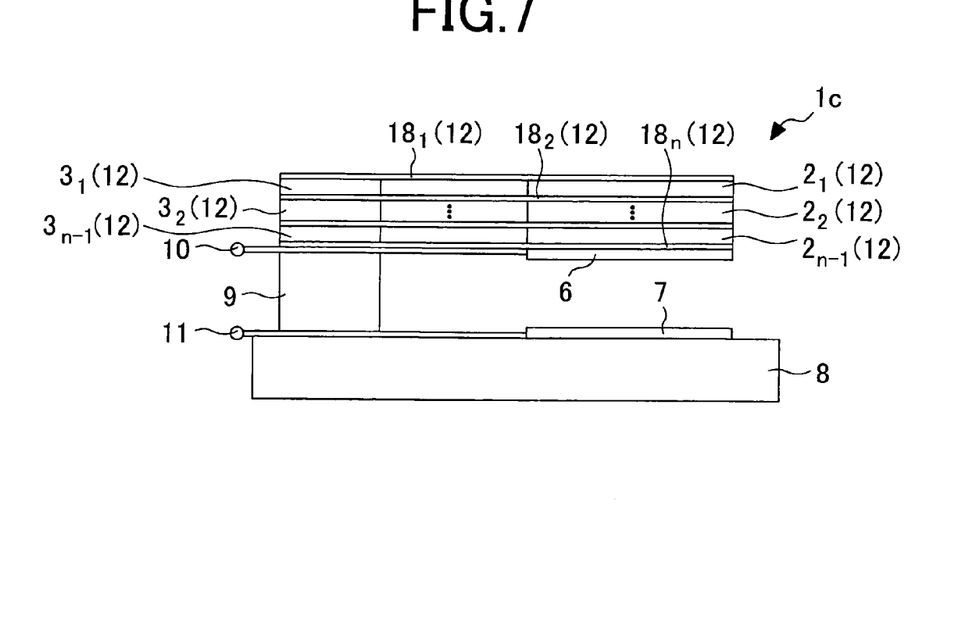
FIG. 7 is a side view showing a structure of a variable-capacitance type vibrator according to a third embodiment.
Figure 8:
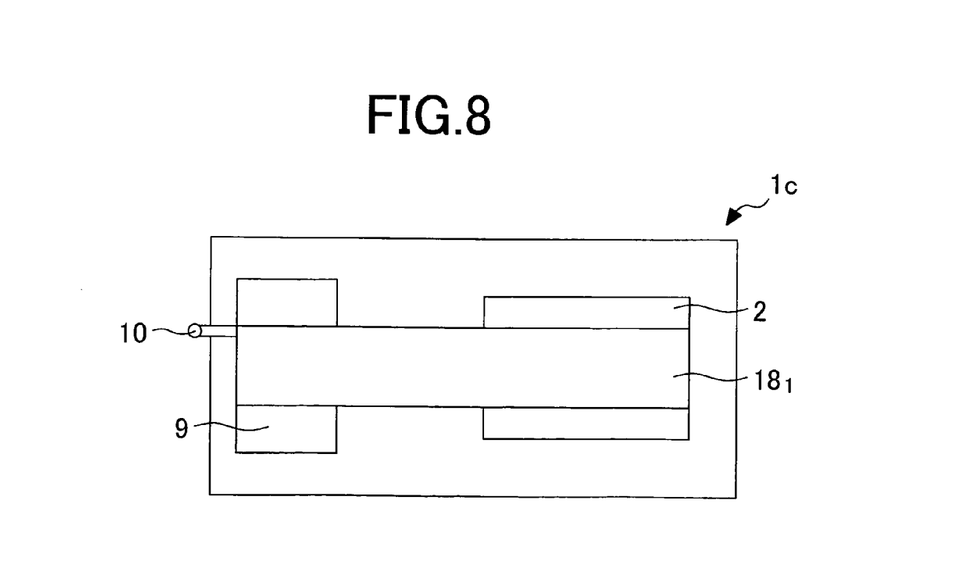
FIG. 8 is a top view of the variable-capacitance type vibrator in FIG. 7.

FIG. 7 is a side view showing a structure of a variable-capacitance type vibrator according to a third embodiment, and FIG. 8 is a top view of the variable-capacitance type vibrator in FIG. 7.

In a third embodiment, a variable-capacitance type vibrator (vibrational power generation device vibrator) 1c comprises, as illustrated in FIG. 7, a plurality of masses $2_1$ to $2_{n-1}$, a plurality of spacers $3_1$ to $3_{n-1}$, a plurality of oscillation plates $18_1$ to $18_n$, electrodes 6 and 7, an opposite electrode base 8, a vibrator pedestal 9, and electrode wirings 10 and 11.

The oscillation plate(s) $18_1$ (to $18_n$) has/have the same shape as that of the oscillation plate 4 as illustrated in FIG. 1 in the first embodiment, and the masses $2_1$ to $2_{n-1}$ and the spacers $3_1$ to $3_{n-1}$ are respectively sandwiched between the oscillation plates $18_1$ to $18_n$.

For example, the mass $2_1$ and the spacer $3_1$ are sandwiched between the oscillation plate $18_1$ and the oscillation plate $18_2$, and the mass $2_2$ and the spacer $3_2$ are sandwiched between the oscillation plate $18_2$ and the oscillation plate $18_3$. Finally, the mass $2_{n-1}$ and the spacer $3_{n-1}$ are sandwiched between the oscillation plate $18_{n-1}$ and the oscillation plate $18_n$.

In the variable-capacitance type vibrator 1c, the vibrator 12 is constituted by the masses $2_1$ to $2_{n-1}$ the spacers $3_1$ to $3_{n-1}$, and the oscillation plates 18, to 18n, and a space portion between the oscillation plates $18_1$ to $18_n$ and at which the mass 2 and the spacers $3_1$ to $3_{n-1}$ are not in contact with each other functions as a spring.

Also, the remaining arrangement is identical to that of the variable-capacitance type vibrator 1 as illustrated in FIG. 1 in the first Embodiment, and so the explanation thereof will be omitted.

FIG. 8 is a top view of the variable-capacitance type vibrator 1c.

The oscillation plate $18_1$ (to $18_n$) may be smaller or larger in width than the mass $2_1$ (to $2_{n-1}$), and it is desirable that the width of the oscillation plate $18_1$ (to $18_n$) coincides with that of the mass $2_1$ (to $2_{n-1}$) and their central lines matches. Since the oscillation plates $18_2$ to $18_n$ are identical to the oscillation plate $18_1$ in size, they are overlapped with the oscillation plate $18_1$ in FIG. 8.

Note that, if the number of oscillation plates $18_1$ to $18_n$ is two or more, it is not limited to this case. The each number of masses and spacers is determined based on that of the oscillation plates. Also, the oscillation plate $18_n$ may concurrently serve as an electrode, or the opposite electrode base 8 may concurrently serve as an electrode. Further, instead of the structure of sandwiching the masses $2_1$ to $2_{n-1}$ and the spacers $3_1$ to $3_{n-1}$ between the oscillation plates $18_1$ to $18_n$, for example, the oscillation plates $18_1$ to $18_n$ may be formed so that they are supported at regular intervals from an upper end of a spacer side without dividing the masses $2_1$ to $2_{n-1}$ or they are supported at regular intervals from an upper end of a mass side without dividing the spacers $3_1$ to $3_{n-1}$. In this case, the electrode 6 is provided at the mass 2.

For this reason, also in the third embodiment, it is possible to reduce capacitance loss of the vibrator 12 and to remarkably improve the power generation efficiency.

Embodiment 4

Figure 9:
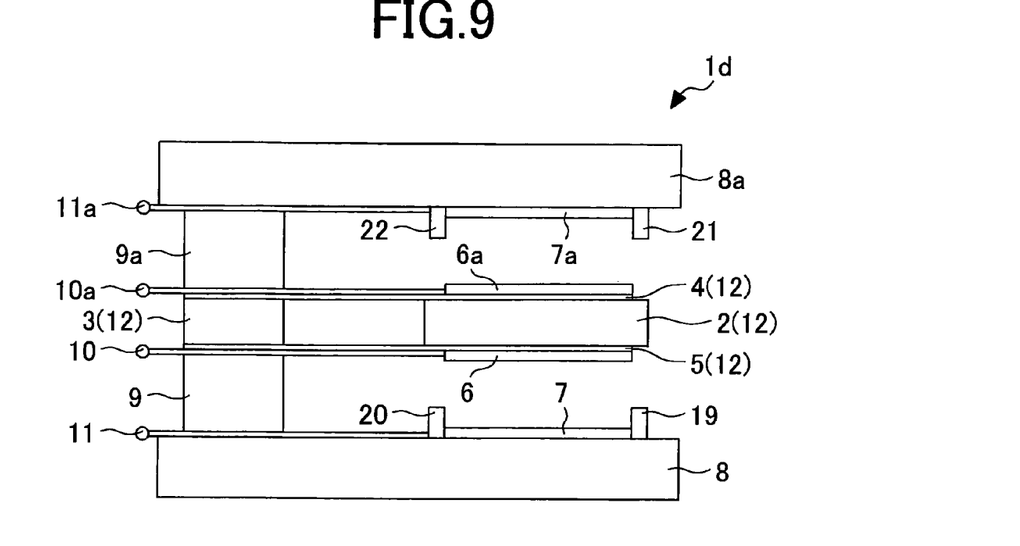
FIG. 9 is a side view showing a structure of a variable-capacitance type vibrator according to a fourth embodiment.
Figure 10:
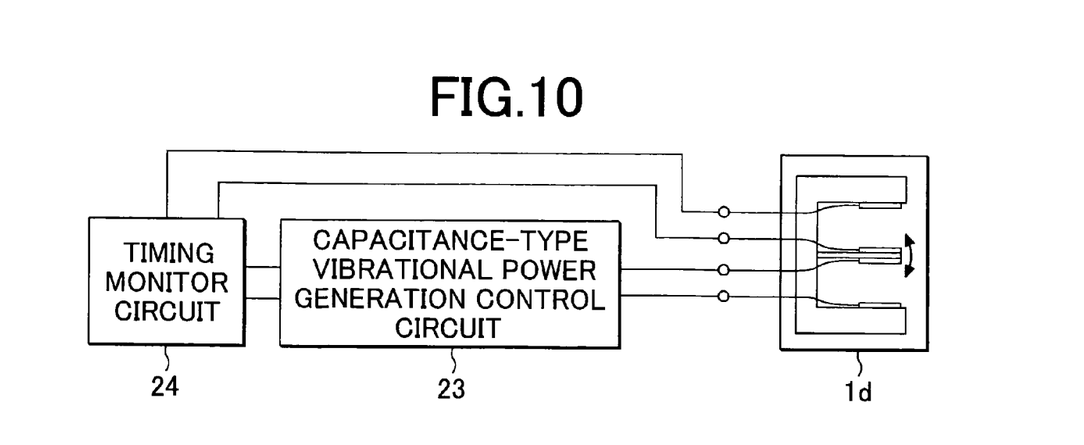
FIG. 10 is block view of a vibrational power generation system constituted by using the variable-capacitance type vibrator in FIG. 9.

FIG. 9 is a side view showing a structure of a variable-capacitance type vibrator according to a fourth embodiment, FIG. 10 is block view of a vibrational power generation system constituted by using the variable-capacitance type vibrator in FIG. 9.

In a fourth embodiment, a variable-capacitance type vibrator (vibrational power generation device vibrator) 1d has the same structure as that described in the first embodiment in FIG. 1, that is, the mass 2, the spacer 3, the oscillation plates 4 and 5, the electrodes 6 and 7, the opposite electrode base 8, the vibrator pedestal 9, and the electrode wiring terminals 10 and 11, and further has a structure in which electrodes 6a and 7a, an opposite electrode base 8a, a vibrator pedestal 9a, electrode wiring terminals (electrode terminals) 10a and 11a, and stoppers 19 to 22 are newly provided.

Also, the arrangement of the mass 2, the spacer 3, the oscillation plates 4 and 5, the electrodes 6 and 7, the opposite electrode base 8, the vibrator pedestal 9, and the electrode wiring terminals 10 and 11 is the same as that of the first embodiment in FIG. 1, and so the explanations thereof will be omitted.

Stoppers (contact prevention devices) 19 and 20 are provided in the vicinity of the electrode 7 of the vibrator pedestal 8. These stoppers 19 and 20 are formed so as to project from the vibrator pedestal 8, and are provided to prevent short circuit due to contact of the electrodes at the time when the electrode 6 comes close to the electrode 7.

One end of the vibrator pedestal 9a in the longitudinal direction is fixed to a surface opposite to the surface of the oscillation plate 4 sandwiching the spacer 3 along with the oscillation plate 5. The electrode base 8a is fixed to a surface opposite to the surface to which the vibrator pedestal 9a is fixed.

The electrode (third electrode) 6a having, for example, a rectangular shape is provided on a surface opposite to the surface of the oscillation plate 4 on which the mass 2 is disposed. The electrode (fourth electrode) 7a having the same shape as the electrode 6 is provided on a lower surface of the electrode base 8a facing the electrode 6a.

Stoppers (oscillation control structures) 21 and 22 are provided in the vicinity of the electrode 7a on the electrode base 8a. These stoppers 21 and 22 are provided so as to project from the vibrator pedestal 8a, and provided to prevent short circuit due to contact of the electrodes at the time when the electrode 6a comes close to the electrode 7a. The electrodes 6a and 7a are respectively connected to output wires, and electrode wiring terminals 10a and 11a are respectively connected to the output wires.

Also, in the variable-capacitance type vibrator 1d, the vibrator 12 is constituted by the mass 2, the spacer 3, and the oscillation plates 4 and 5, and a spaced portion between the oscillation plates 4 and 5 and in which the mass 2 and the spacer 3 are not in contact with each other functions as a spring.

Further, in the variable-capacitance type vibrator 1d, a capacitance to be a variable capacitance for power generation (first capacitance) is constituted by the electrodes 6 and 7, and another capacitance to be reference capacitance for timing control (second capacitance) is constituted by the electrodes 6a and 7a. Phases of capacitance values of the variable capacitance constituted by the electrodes 6 and 7 and the variable capacitance constituted by the electrodes 6a and 7a are reversed by 180°.

By using the variable-capacitance type vibrator 1d of the above arrangement in a vibrational power generator system as illustrated in the first embodiment (FIG. 4), it is possible to double the generated power.

FIG. 10 is block view of a vibrational power generation system constituted by using the variable-capacitance type vibrator 1d.

This vibrational power generator system comprises a capacitance-type vibrational power generation control circuit 23, a timing monitor circuit 24, and the variable-capacitance type vibrator 1d.

The timing monitor circuit 24 monitors, on the basis of the reference capacitance for timing control of the variable-capacitance type vibrator 1d, operational phases of the vibrator, and detects optimal timings for capacitance change in the vibrator.

The capacitance-type vibrational power generation control circuit 23 performs input and output of electric charges based on results of detection of the timing monitor circuit 24 to generate power.

For this reason, in the fourth embodiment, by monitoring the reference capacitance for timing control, which is constituted by the electrodes 6a and 7a, optimal timings for the capacitance change in the vibrator 12 can be detected, so that power generation can be achieved with high efficiency.

Fifth Embodiment

Figure 11:
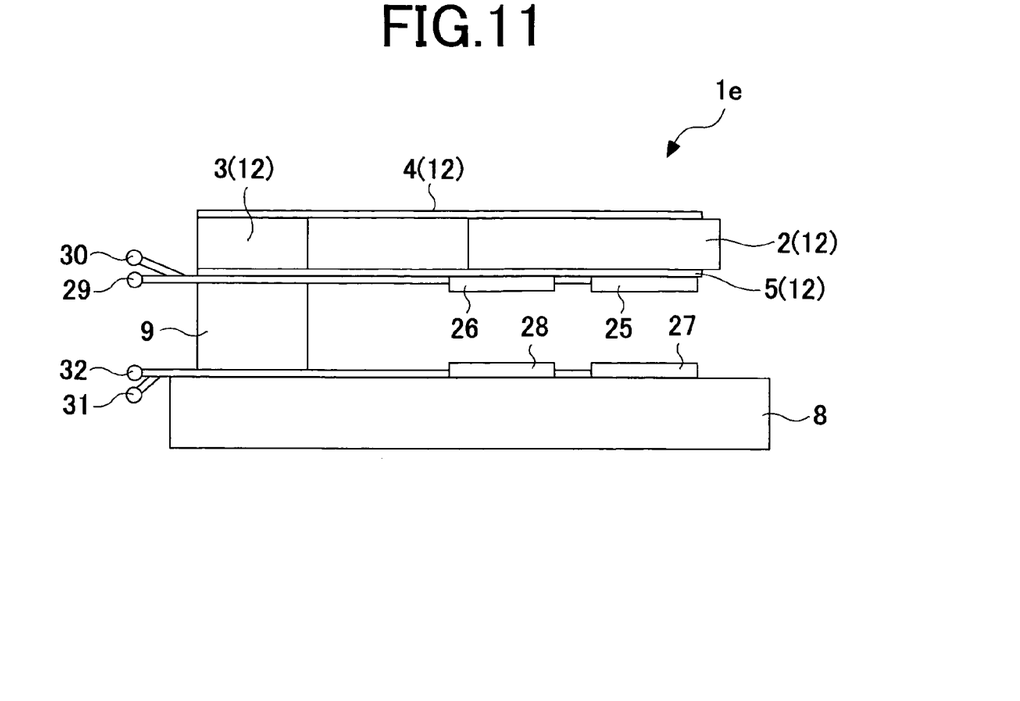
FIG. 11 is a side view showing a structure of a variable-capacitance type vibrator according to a fifth embodiment.
Figure 12:
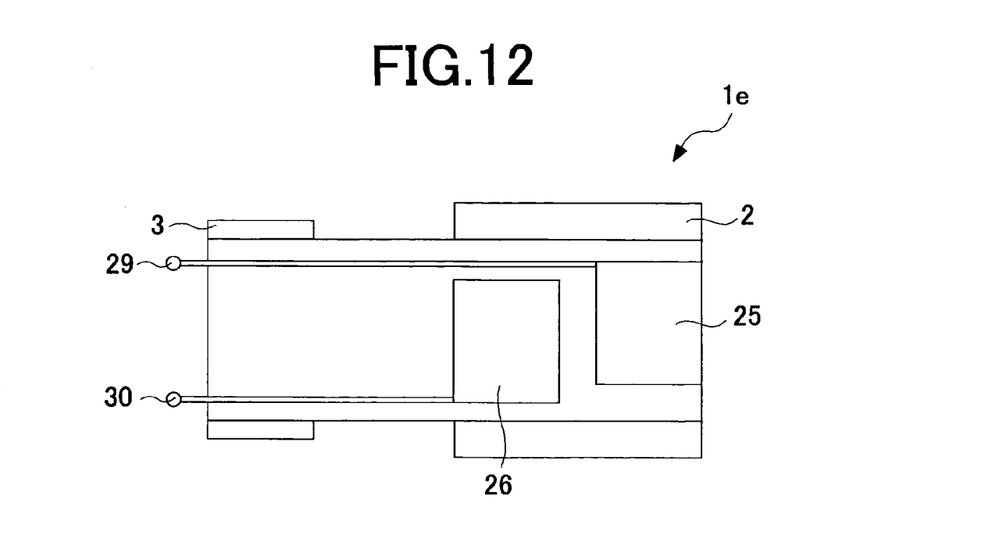
FIG. 12 is a bottom plan view of a vibrator provided in the variable-capacitance type vibrator in FIG. 11.

FIG. 11 is a side view showing a structure of a variable-capacitance type vibrator according to a fifth embodiment, FIG. 12 is a bottom plan view of a vibrator provided in the variable-capacitance type vibrator in FIG. 11.

In a fifth embodiment, a variable-capacitance type vibrator (vibrational power generation device vibrator) 1e has, as illustrated in FIG. 11, the same structure as that described in the first embodiment in FIG. 1, that is, the mass 2, the spacer 3, the oscillation plates 4 and 5, the opposite electrode base 8, and the vibrator pedestal 9, and further has a structure in which electrodes 25 to 28 and electrode wiring terminals (electrode terminals) 29 to 32 are newly provided.

Also, the arrangement of the mass 2, the spacer 3, the oscillation plates 4 and 5, the opposite electrode base 8, and the vibrator pedestal 9 is identical to that of the first embodiment in FIG. 1, and so the explanation thereof will be omitted here.

The electrode (first electrode) 25 and the electrode (third electrode) 26 having, for example, a rectangular shape, are provided next to each other on a surface opposite to the surface of the oscillation plate 5 on which the mass 2 is disposed, and the electrode (second electrode) 27 and the electrode (fourth electrode) 28 having the same shape as those of the electrodes 25 and 26 are provided next to each other on an upper surface of the opposite electrode base 8 facing the electrodes 25 and 26. In this case, a capacitance is constituted by the electrodes 25 and 27, and another capacitance is constituted by the electrodes 26 and 28.

Output wires are respectively connected to the electrodes 25 and 26, and electrode wiring terminals 29 and 30 are respectively connected to these output wires. Similarly, output wires are respectively connected to the electrodes 27 and 28, and electrode wiring terminals 31 and 32 are respectively connected to these output wires.

Also, in the variable-capacitance type vibrator 1e, the vibrator 12 is constituted by the mass 2, the spacer 3, and the oscillation plates 4 and 5, and a spaced portion of between the oscillation plates 4 and 5 and at which the mass 2 and the spacer 3 are not in contact with each other functions as a spring.

FIG. 12 is a bottom plan view of a vibrator provided in the variable-capacitance type vibrator 1e, and shows such an example that wires extending up to the electrode wiring terminals 29 and 30 connected to the electrodes 25 and 26 are formed in the vicinity of long side portions opposite thereto to avoid contact of the above wires.

The variable-capacitance type vibrator 1e may be used, for example, in the vibrational power generator (FIG. 10) as illustrated in the above fourth embodiment. In the vibrational power generator as illustrated in the above fourth embodiment, the variable capacitance for power generation and the variable capacitance for reference are operated at a phase shift of 180°. However, when using the variable-capacitance type vibrator 1e, the variable capacitance for power generation (for example, the variable capacitance constituted by the electrodes 25 and 27) and the variable capacitance for reference (for example, the variable capacitance constituted by the electrodes 26 and 28) are operated synchronously.

For this reason, also in the fifth embodiment, by monitoring the reference capacitance for timing control, which is constituted by the electrodes 26 and 28, optimal timings for capacitance change in the vibrator 12 can be detected, whereby power generation can be realized with high efficiency.

As described above, the invention made by the present inventors has been concretely described based on the embodiments. However, needless to say, the present invention is not limited to the above-mentioned embodiments, and can be variously modified and altered without departing from the gist thereof.

What is claimed is:

1. A vibrational power generation device vibrator comprising:
    first and second electrodes constituting a first capacitance;
    third and fourth electrodes constituting a second capacitance;
    a vibrator provided with said first and third electrodes;
    an electrode base provided with said second and fourth electrodes;
    a vibrator pedestal for fixing said vibrator onto said electrode base; and
    an electrode terminal respectively connected to said first to fourth electrodes and performing an input and output of electric charges from the exterior,
    wherein said vibrator includes a mass performing an undriven vibration and two oscillation plates for supporting said mass,
    wherein said oscillation plates sandwich and support a first surface of said mass and a second surface opposite thereto in a mutually parallel manner, and
    wherein said vibrator is operated through vibrational energy to change a capacitance by controlling a distance between said first and third electrodes and a distance between said second and fourth electrodes provided at said vibrator.

2. The vibrational power generation device vibrator according to claim 1,
    wherein said first electrode is provided on a first surface of said vibrator, wherein said third electrode is provided on a second surface of said vibrator facing said first surface, wherein said second electrode is provided at said electrode base so as to face said first electrode, and wherein said fourth electrode is provided at said electrode base so as to face said third electrode.

3. The vibrational power generation device vibrator according to claim 1, wherein said first and third electrodes are provided on a first surface of said vibrator, and wherein said second and fourth electrodes are provided at said electrode base so as to respectively face said first and third electrodes.

4. The vibrational power generation device vibrator according to claim 1, wherein said first electrode is provided on a first surface of said vibrator, wherein said third electrode is provided on a second surface of said vibrator facing said first surface, wherein said second electrode is provided at said electrode base so as to face said first electrode, wherein said fourth electrode is provided at said electrode base so as to face said third electrode, and wherein said electrode base is provided with a contact prevention device for preventing contact between said first and third electrodes and said second and fourth electrodes at the time when said vibrator is operated through vibrational energy.

5. The vibrational power generation device vibrator according to claim 1, wherein said first and third electrodes are provided on a first surface of said vibrator, wherein said second and fourth electrodes are provided at said electrode base so as to respectively face said first and third electrodes, said electrode base comprising:

a contact prevention device for preventing contact between said first and third electrodes and said second and fourth electrodes at the time when said vibrator is operated through vibrational energy; and an oscillation control structure for suppressing excessive vibration of said oscillation plates at the time when said vibrator is operated through vibrational energy.

* * * * *